United States Patent [19]

Perkins

[11] Patent Number: 4,515,026

[45] Date of Patent: May 7, 1985

[54] TRANSMISSION

[76] Inventor: Frank M. Perkins, 257 Avenida Atezsda, Redondo Beach, Calif. 90277

[21] Appl. No.: 467,140

[22] Filed: Feb. 16, 1983

[51] Int. Cl.³ ............................................. F16H 35/02
[52] U.S. Cl. ........................................ 74/63; 74/394
[58] Field of Search ................... 74/394, 679, 63, 393

[56] References Cited

U.S. PATENT DOCUMENTS

| | | | |
|---|---|---|---|
| 1,190,764 | 7/1916 | Hazen | 74/131 |
| 1,340,486 | 5/1920 | Jackson et al. | 74/131 |
| 1,850,070 | 3/1932 | Booth | 74/131 |
| 3,027,779 | 4/1962 | McNaney | 74/679 |
| 3,118,318 | 1/1964 | Rauhut | 74/394 |
| 3,274,845 | 9/1966 | Moran | 74/679 |
| 3,295,380 | 1/1967 | Osborn | 74/679 |
| 3,763,717 | 10/1973 | Lenoir et al. | 74/679 |
| 3,817,122 | 6/1974 | Lenoir et al. | 74/679 |

FOREIGN PATENT DOCUMENTS

| | | | |
|---|---|---|---|
| 1275167 | 9/1961 | France | 74/131 |
| 350770 | 4/1937 | Italy | 74/131 |
| 448375 | 5/1949 | Italy | 74/131 |

Primary Examiner—Lawrence J. Staab
Attorney, Agent, or Firm—William C. Babcock

[57] ABSTRACT

A mechanical transmission with a variable speed ratio that generates two oscillatory rotary motions that may have the velocities thereof selectively increased or decreased by concurrently increasing or decreasing the effective lengths of a pair of crank arms, with one of the oscillating rotary motions being rectified by two over riding clutches to become a pulsating rotary motion in a constant direction, and the pulsating and oscillating rotary motions thereafter being combined by a differential to result in a fixed ratio of output to input velocity for each setting of the pair of crank arms.

8 Claims, 14 Drawing Figures

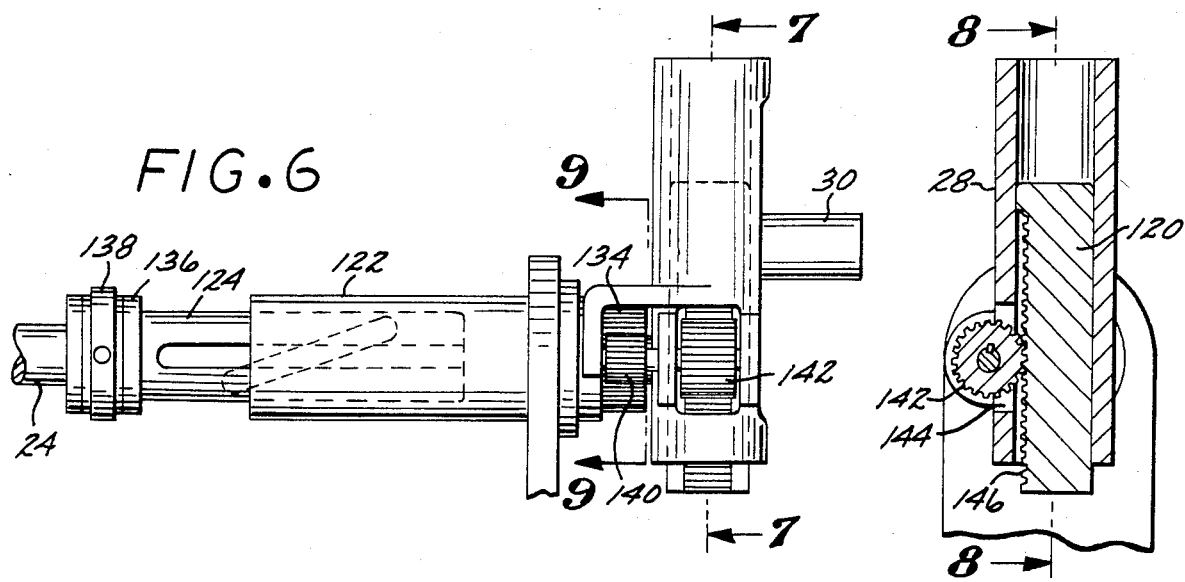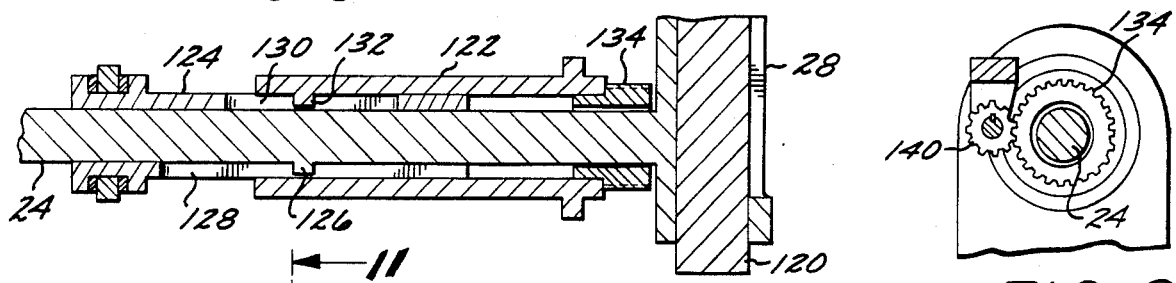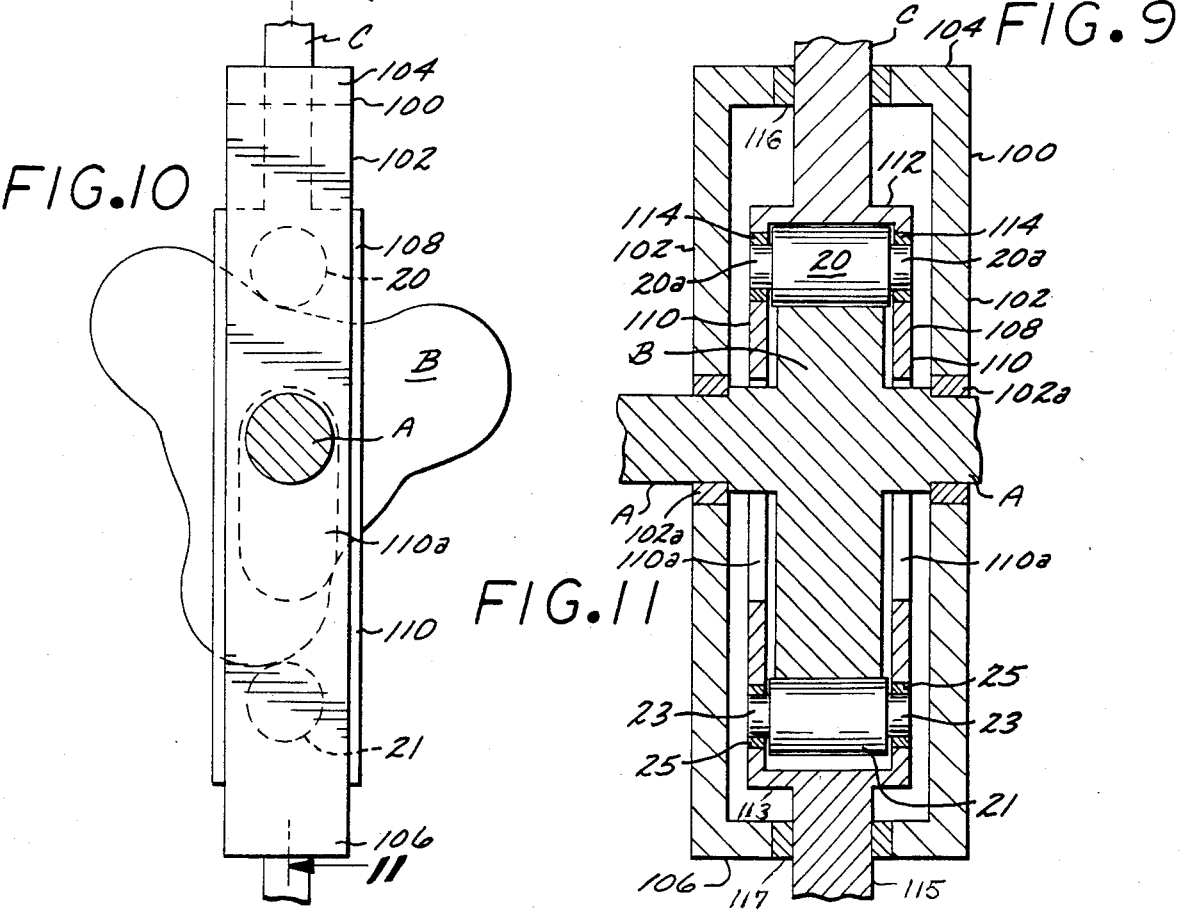

TRANSMISSION

DESCRIPTION OF THE PRIOR ART

In the past, it has been common for transmissions that have a constant velocity input to have a fluctuating velocity output, such as a mechanical transmission patented by the Lenney Machine & Manufacturing Company of Warren, Ohio, that has an output velocity-time curve of scalloped form which is a succession of crests of sine waves. Another example is the Vickers hydraulic piston type transmission in which the output velocity is made up of a sum of sine waves, and the output itself being a sine wave.

A major object of the present invention is to provide a transmission that is completely mechanical, has a ratio of output velocity to input velocity that may be varied from zero to a finite valve such as unity, and one that produces a positive drive without energy being lost by frictional slipage of a clutch type mechanism as in the case of hydraulic devices.

A further object of the invention is to supply a transmission that requires no unusual or expensive gearing, includes no belt, chain drives, or tapered cone devices to obtain a speed variation, and has no point contact frictional elements to transmit power, such as ball bearings held between two tapered parallel mounted rotating cones.

These and other objects and advantages of the invention will become apparent from the following description of a preferred form thereof.

SUMMARY OF THE INVENTION

The transmission includes a housing that preferably has a first end through which an input shaft extends and a second end that rotatably supports an output shaft. Supported within the housing intermediate the input and output shafts are the following elements. A cam that has at least one lobe, which cam is driven by the input shaft. A follower is at all times in contact with the cam, which follower imparts linear oscillating motion to a first rack that imparts rotary oscillating motion to a first pinion.

The first pinion imparts rotary oscillating motion to a second crank of variable length, which crank imparts linear oscillating motion to a second rack that is in toothed engagement with a second pinion. The oscillating rotary motion of the second pinion is transferred to a rectifier that transforms the motion to rotary pulsating motion that is delivered to a differential that drives the output shaft.

The input shaft also rotates a third pinion that is in toothed engagement with a fourth pinion that rotates a first crank of variable length. The first crank imparts rotary oscillating motion to a third rack that is in toothed engagement with a fifth pinion through which rotary oscillating motion is fed to the differential.

The transmission includes means for selectively and concurrently varying the effective lengths of the first and second cranks to control the velocity of the output shaft.

The differential transforms the pulsating and oscillating rotary motions fed thereto into a substantially constant rotary motion of a desired velocity that is transmitted to the output shaft.

BRIEF DESCRIPTION OF THE DRAWINGS

FIG. 6 is a side elevational view of one of the crank structures of variable length;

FIG. 7 is a longitudinal cross sectional view of the crank structure taken on the line 7—7 of FIG. 6;

FIG. 8 is a cross sectional view of the crank structure taken on the line 8—8 of FIG. 7;

FIG. 9 is a transverse cross sectional view of the crank structure taken on the line 9—9 of FIG. 6;

FIG. 10 is a side elevational view of the cam and supporting structure;

FIG. 11 is a cross sectional view of the cam structure taken on the line 11—11 of FIG. 10;

DESCRIPTION OF THE PREFERRED EMBODIMENT

The transmission T of the present invention includes a housing H that has forward and rearward end walls 10 and 12, a pair of side walls 14, top 16 and bottom 18. The housing H for simplicity is shown as an integral unit, but in practice it would be formed from at least two portions that are removably secured together to permit access to the interior of the housing.

Figure 1:
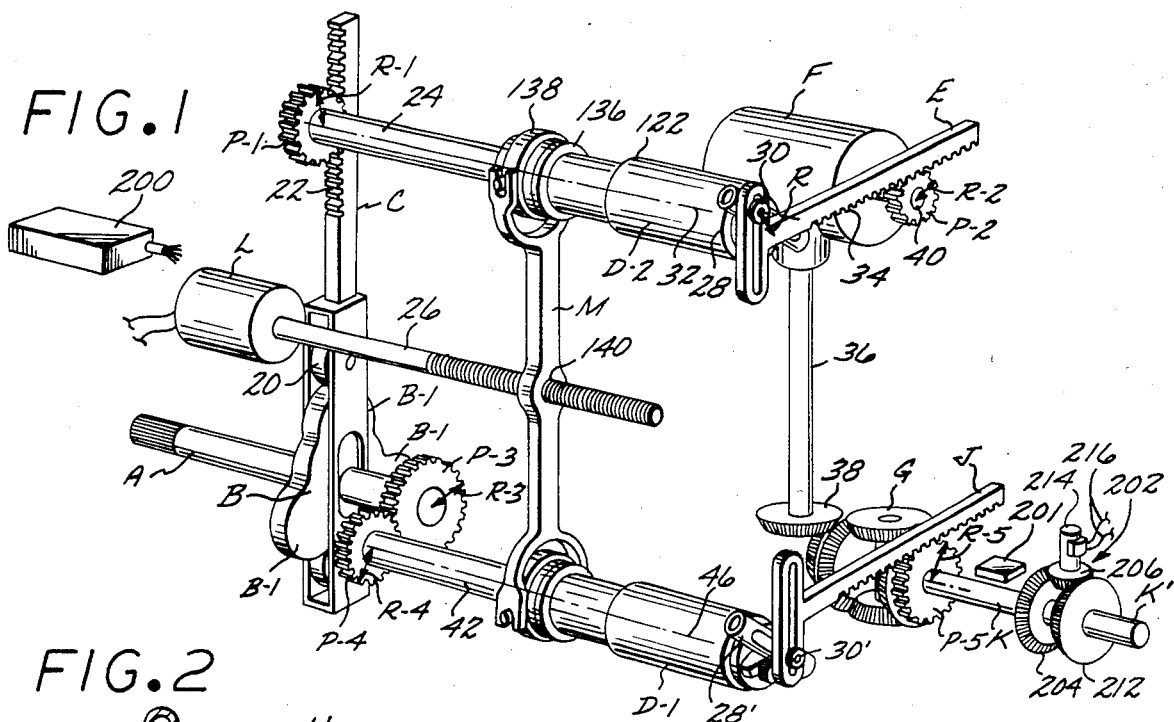
FIG. 1 is a schmatic view in perspective of the components of the transmission in operative association.

The forward end wall 10 rotatably supports a longitudinally disposed rearwardly extending input shaft A that rotates through an angle $\beta$. Shaft A on the rearward end has a cam B rigidly secured thereto, which cam has at least one lobe B-1. In FIG. 1 the cam B is illustrated as having three lobes B-1 that are circumferentially spaced from one another.

Cam B has followers 20 and 21 in the form of rollers that are at all times in contact therewith. Follower 20 and 21 are rotatably supported from one end of an elongate rack C that has a number of longitudinally spaced teeth 22 defined thereon.

Teeth 22 are in engagement with the teeth of a rotatably supported first pinion P-1 that has a first radius R-1. The pinion P-1 is secured to a shaft 24 that drives a second variable crank assembly D-2. The assembly D-2 has a second crank arm 28 that supports a crank pin 30 that may have the radius thereof varied relative to the centerline 32 about which the crank arm revolves by a control arm M. The operation of the control arm M will later be described in detail.

As the first rack C oscillates in imparts rotary oscillatory motion to the first pinion P-1 which is transferred through shaft 24 and second assembly D-2 to the second crank pin 30. The second crank pin 30 as it rotatably oscillates about centerline 32 imparts linear oscillatory motion to a second elongate rack E that has a number of longitudinally spaced teeth 34 defined thereon.

Second pinion P-2 that has a radius R-2 as it rotatably oscillates drives the rectifier F shown in FIG. 1. The rectifier F transforms the oscillating rotary motion of second pinion P-2 to pulsating rotary motion that is delivered to a shaft 36 that has a gear 38 secured thereto that forms a part of the differential assembly G.

$\beta$ is the actual angle turned by the transmission input shaft A, but for convenience the parameter $\theta$ is used throughout the specification to make the equations independent of the number of lobes B-1 on the cam B. The parameter $\theta$ goes through a complete cycle when the cam follower 20 goes from one extreme to the other, that is, either an ascent or descent of one lobe.

The distance X is the distance moved by the center of the cam follower 20 and is consequently the distance moved by the first rack C. The surface shape of the cam C will depend not only on X but upon the radius of the follower 20, and how close or how far the cam follower center comes to the center of the cam B. The equation for X is the same when the cam follower 20 goes from trough to peak or from peak to trough on the cam B even though the direction of motion is opposite. This treatment is permissible since the rectifier F will eventually reverse the direction of every alternate motion of the second rack E. The cam B is cut to yield the following equation for X.

$$X = (R) \chi \text{ ARC SIN}\left(\frac{\theta - \text{SIN } \theta}{\pi}\right) \quad (1)$$

The radius R-1 used must be the radius of first pinion P-1 so that the angle turned by the shaft 24 will be $$\gamma = \text{ARC SIN}\left(\frac{\theta - \text{SIN } \theta}{\pi}\right) \quad (2)$$

When $\theta$ and $\gamma$ are both measured from the mid position of the first rack C, as $\theta$ goes from $-\pi$ to $+\pi$, $\gamma$ will go from $-(\pi/2)$ through O to $+(\pi/2)$ and on its next cycle from $+(\pi/2)$ through O to $-(\pi/2)$.

Thus, and consequently second crank arm 28 will traverse back and forth through a total arc of 180°. The extreme position of the angle correspond to the extreme position of second crank arm 28 relative to crank pin 30.

The radius of the crank pin 30 relative to centerline 32 is designated in FIG. 1 as R. Y is the displacement of the second rack E from the mean position.

The displacement of second rack E is given by the equation.

$$Y = R \cdot \text{SIN } \gamma \quad (3)$$

Substituting from equation (2) into (3) yields the equation for Y from the mean position.

$$Y = R\left(\frac{\theta - \text{SIN } \theta}{\pi}\right) \quad (4)$$

If pinion P-2 turned by second rack E has a radius of $1/2\pi$, then the pinion shaft 40 that drives the rectifier F will rotate through an angle $\phi$ positively or negatively during each cycle of $\theta$ $$\phi = 2R (\theta - \text{SIN } \theta) \quad (5)$$

Differentiation of equation (5) shows that the shaft angular velocity comes to a halt at the end of each cycle $\theta$.

$$d\phi/d\theta = 2R (1 - \text{COS } \theta) \quad (6)$$

The oscillating rotary motion of the shaft 40 into rectifier F results in the output shaft 36 rotating in accordance with equations (5) and (6), but with the shaft instead of reversing its direction after each instantaneous halt resuming motion in the original direction.

The input shaft A in addition to rotating cam B also rotates pinion P-3 which meshes with pinion P-4 that turns variable crank assembly D-1 as shown in FIG. 1. Since the desired input for first variable crank assembly D-1 is the angle $\theta$, the radius R-3 of pinion P-3 must be 2Q times as great as radius R-4 of pinion P-4. Q is the number of cam lobes B-1 of cam B.

The input $\theta$ to the first variable crank assembly D-1 is proportional to the transmission input $\beta$. First and second variable crank assemblies D-1 and D-2 are of identical structure.

Identical elements of first variable crank assembly D-1 to those in second crank assembly D-2 are designated on the drawing by the same numbers but with a prime being added to the numbers in the first crank assembly. The crank pins 30 and 30' will at all times move with the same radius R due to control arm M for reasons that will later be explained in detail. The motion of the third rack J shown in FIG. 1 measured from its mean position is:

$$Z = R \text{ SIN } \theta \quad (7)$$

The third rack J moving through Z drives a fifth pinion P-5 which is an input to differential G as shown in FIG. 1. Pinion P-5 has a radius R-5 equal to '/2 so its angular input to the differential G is:

$$\omega = 2R \text{ SIN } \theta \quad (8)$$

The differential G adds equation (8) to the rectified $\phi$ of equation (5) to yield an output angle proportional to the controlled radii R and the transmission input $\beta$.

Adding the two equations yields:

$$\omega = R\theta \text{ or} \quad (9)$$

$$\omega = (2Q) R \quad (10)$$

The constant 2Q of equation 10 may be multiplied by any constant desired by simply dividing the radii R-2 and R-5 of pinions P-2 and P-5 by this same constant. The only requirement is that R-5 continue to be $\pi$ times as great as R-2.

Figure 2:
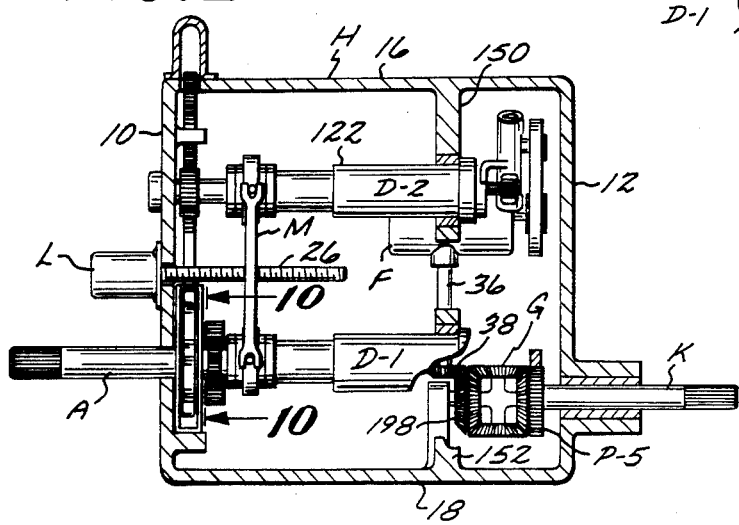
FIG. 2 is a longitudinal cross sectional view of the transmission.
Figure 3:
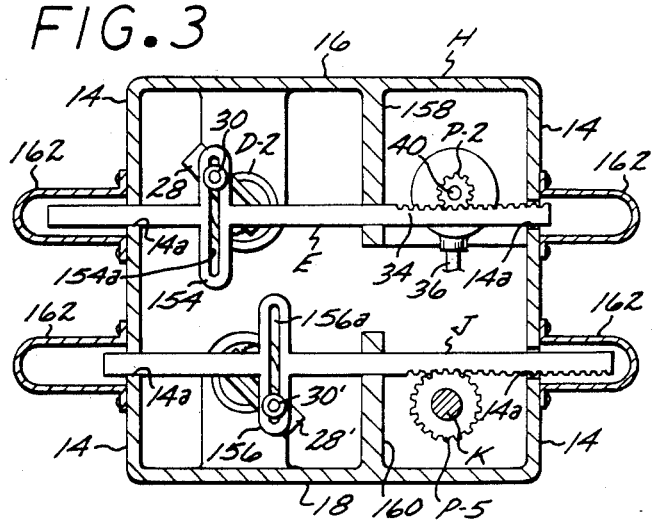
FIG. 3 is a transverse cross sectional view of the transmission.

The components above described are disposed in the main within the housing H as shown in FIGS. 2 and 3. The reversible electric motor L is illustrated in FIG. 2 as being exteriorly disposed on housing H, and supported by conventional means (not shown) from the forward wall 10.

The cam B as can best be seen in FIGS. 10 and 11 is situated within a cage 100 that is defined by a pair of spaced, parallel, side walls 102, top 104, and bottom 106. The pair of side walls 102 have axially aligned bearings 102a therein that rotatably support the input shaft A. A hollow rectangular member 108 is disposed within the cage 100 and includes a pair of side pieces 110 that extend downwardly on opposite sides of the cam B, and the member also including a top piece 112 and bottom piece 113.

The first elongate rack C has a lower end thereof secured to the top piece 112, with the portion of the rack adjacent to the top piece being slidably supported in a bushing 116 mounted in the top 104.

A first follower 20, which is in the form of a roller, is situated in the upper portion of the member 108, which roller has stub shafts 20a projecting outwardly from opposite ends thereof that are rotatably supported in bearings 114. The bearings 114 are situated within openings formed in the side pieces 110. The pair of side pieces 110 have elongate slots 110a therein that allow input shaft A to extend through cage 100 as shown in FIG. 11.

A second follower 21 having stub shafts 23 projecting outwardly from the ends thereof that engage bearings 25 is rotatably supported in the lower portion of a hollow rectangular member 108 as shown in FIG. 11. The cam B has an odd number of lobes B-1 that permits both the first and second followers 20 and 21 to be in continuous contact with the cam B. The first follower 20, member 108 and rack C are concurrently moved upwardly when the first follower is driven upwardly on one of the lobes B-1 as the cam B rotates. The second follower 21, member 108 and rack C are concurrently moved downwardly when one of the lobes B-1 moves downwardly relative to the second follower 21. The followers 20 and 21 are at all times in rolling contact with cam B and are sufficiently wide that the rack C and member 108 will not pivot transversely relative to the cabe 100 and bushing 116. A pin 115 extends downwardly from bottom piece 113 to slidably engage a bushing 117 in bottom 106 to maintain the rack C in an axially aligned position with the cage 100.

The variable crank arm assemblies D-1 and D-2 are of identical structure and only the structure of the second variable crank arm assembly D-2 in detail. Parts of the first variable crank arm assembly D-1 that are common to the second assembly D-2 will have parts identical to those in the second assembly but with primes added thereto. The structure of the second variable crank arm assembly D-2 is shown in detail in FIGS. 6 to 9 inclusive.

The second crank arm 28 is of tubular form and is rigidly secured to the rear end of shaft 24 as shown in FIG. 8. A rod 120 is slidably supported in crank arm 28, which rod has the crank pin 30 extending outwardly therefrom through a longitudinal slot defined in the arm. Second variable crank arm assembly D-2 includes an outer sleeve 122 in which shaft 24 is disposed. A tubular sleeve 124 is intermediately disposed between shaft 24 and outer sleeve 122.

A lug 126 is formed integral with shaft 24. Lug 126 slidably engages an elongate straight groove 128 formed in intermediate sleeve 124. A helical groove is formed in intermediate sleeve 124 opposite straight groove 128. Helical groove 130 is slidably engaged by a lug 132 that extends inwardly from outer sleeve 122. A gear 134 is secured to the rear end of outer sleeve 122.

From the above description it will be seen that the intermediate sleeve 124 and shaft 24 cannot rotate relative to one another, but intermediate sleeve 124 may move axially relative to the shaft 24.

A circumferentially grooved collar 136 is secured to the forward end of the intermediate sleeve 124, which collar is rotatably engaged by a circular bearing 138 supported in a fixed position on one end of the control arm M. The threaded rod 26 engages a tapped transverse bore 140 in controlled arm M. When electric motor L is energized, rod 26 rotates, and concurrently moves intermediate sleeves 124 and 124' longitudinally relative to outer sleeves 122 and 122'. Longitudinal movement of intermediate sleeve 124 relative to outer sleeve 122 causes outer sleeve 122 and gear 134 to turn concurrently relative to shaft 24 and crank arm 28. Rotation of gear 134 causes concurrent rotation of two axially aligned gears 139 and 142 that are rotatably supported from the crank structure assembly as shown in FIG. 6. Gear 142 extends through an opening 144 in crank arm 28 as shown in FIG. 7 and engages teeth 146 on rod 120.

From the above description it will be seen that the radii R for both the crank pins 30 and 30' may be varied concurrently by movement of the control arm M. As the radii R of the crank pins 30 and 30' is increased or decreased the magnitude of the oscillatory motion of the racks E and J is increased or decreased. When the crank pins 30 and 30' are co-axially aligned with the centerlines 32 and 46 there will be no oscillatory motion imparted to the racks E and J. The forward end portions of the shafts 24 and A are rotatably supported in forward end wall 10 and rearward portions of outer sleeves are held in fixed axial positions in mountings 150 and 152 in housing H as may be seen in FIG. 2.

The racks E and J as used in housing H have intermediate elongate transverse portions 154 and 156 in which elongate slots 154a and 156a are defined that are slidably and rotatably engaged by the crank pins 30 and 30'.

The portions of the racks E and J to the right of the transverse portions 154 and 156 are slidably supported in mountings 158 and 160 that form a part of the housing H. End portions of the racks E and J are slidably supported in openings 14a in sidewalls 14 of housing H, which openings have dust covers 162.

Figure 12:
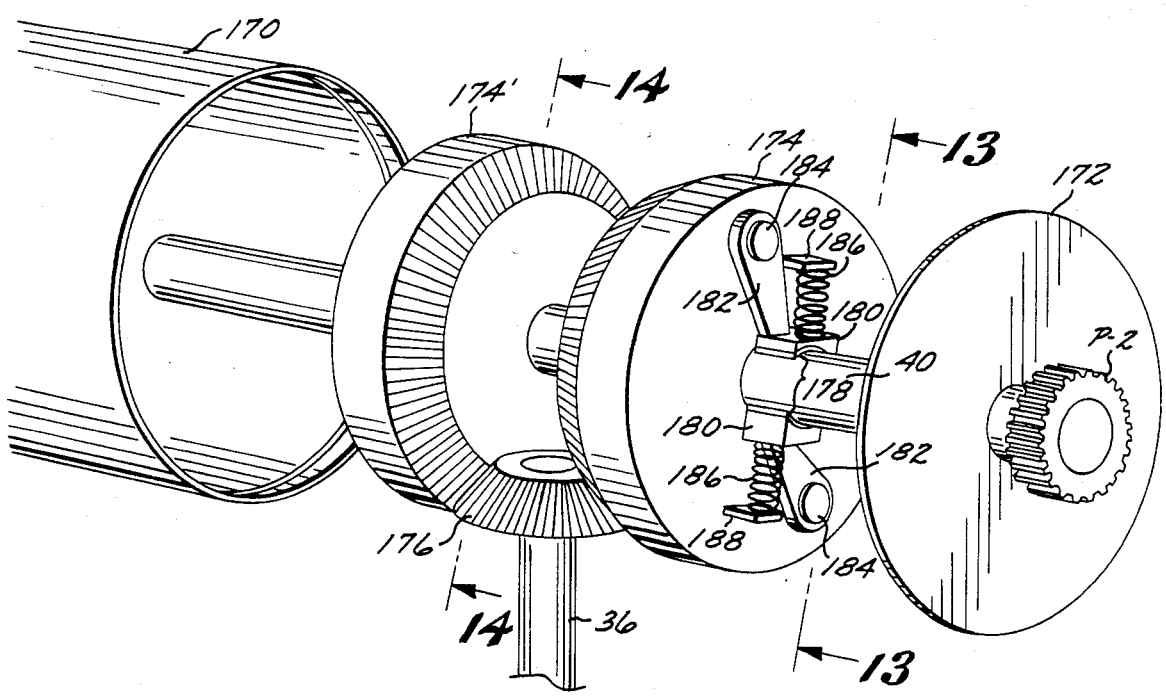
FIG. 12 is an exploded perspective view of the components of the rectifier.
Figure 13:
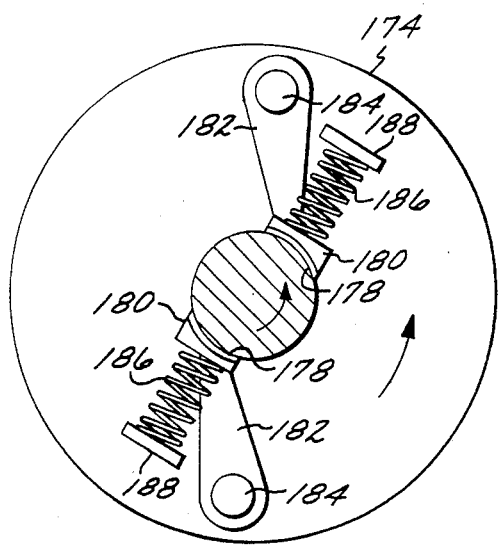
FIG. 13 is an end elevational view of one of the components of the rectifier taken on the line 13—13 of FIG. 12.
Figure 14:
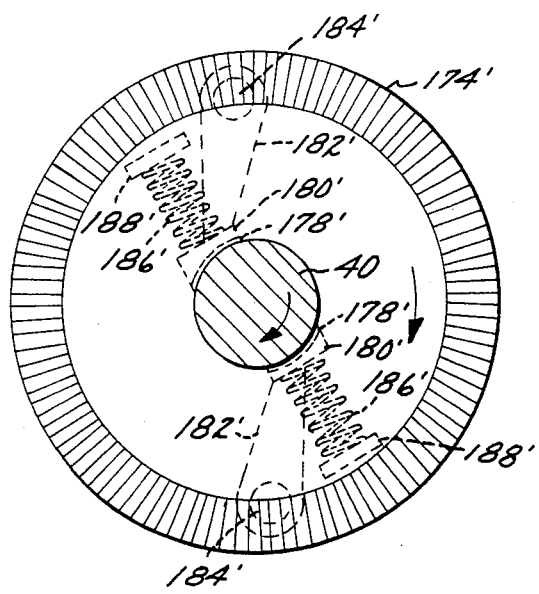
FIG. 14 is a side elevational view of the components of the rectifier taken on the line 14—14 of FIG. 12.

The structual details of one form of rectifier F is shown in FIGS. 12 to 14 inclusive. Rectifier F includes a cylindrical housing defined by a shell 170 and end pieces 172 secured thereto by conventional means (not shown). But one of the end pieces 172 is shown in FIG. 12. Shaft 40 extends longitudinally through shell 170 and is rotatably supported by end pieces 172.

First and second driving gears 174 and 174' are rotatably supported on shaft 40 in fixed lateral spaced relationship by conventional means (not shown). The first and second gears 174, 174' are at all times in toothed engagement with a driven third bevel gear 176 that is rigidly secured to the upper end of shaft 36 as viewed in FIG. 1.

Two oppositely disposed brake shoe friction defining surface members 178 are shown in abutting contact with shaft 40 that is of substantial diameter. If greater surface contact for the members 178 is desired, such may be provided by a drum (not shown) that is made integral with or secured to shaft 40. The members 178 are secured to brake shoes 180 mounted on first ends of lever 182 that have second ends thereof pivotally supported by pins 184 that project outwardly from gear 174. The levers 182 as shown in FIG. 13 are canted at an angle relative to the shaft 40, and in a direction that the toggle action of the brake shoes 178 will cause them to bind when the shaft 40 rotates in a counter clockwise direction as viewed in FIG. 13.

A pair of light compressed helical springs 186 are disposed between outer surfaces of brake shoes 180 and lugs 188 that extend outwardly from a flat side surface 174a of first bevel gear 174. The springs 186 serve to maintain members 178 in light contact with the surface of shaft 40 as the latter is subjected to rotary oscillatory motion. Due to the toggle action of the levers 182 the first gear 174 will bind with shaft 40 and rotate third bevel gear 176 only when shaft rotates in a counter clockwise direction.

Second gear 174' has the same structure as gear 174. Elements on gear 174' common to gear 174 are identified by the same numerals previously used but with primes added thereto. In gear 174' the levers 182' are canted at an angle relative to shaft 40, that second gear 174' rotates only when the shaft 40 rotates in a clockwise direction.

From the above description it will be seen that the rotary oscillatory motion of shaft 40 is transformed by rectifier F to rotary motion to shaft 36 in but a single direction.

Figure 5:
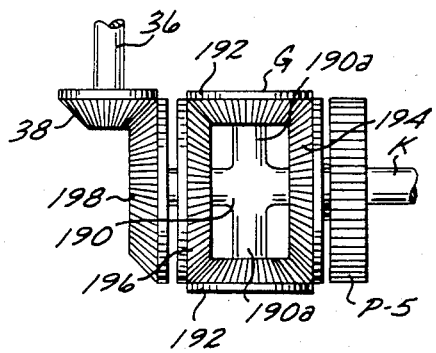
FIG. 5 is a side elevational view of the differential.

The differential G as shown in FIG. 5 includes a spider 190 that has two shafts 190a extending outwardly transversely to output shaft K and rigidly secured thereto. Shafts 190a rotatably support two idler gears 192 of bevel shape. Two principal differential gears 194 and 196 of bevel shape are rotatably supported on shaft K and are in toothed engagement with idler gears 192. Pinion P-5 is rotatably supported on shaft K, but is rigidly secured to gear 194. A bevel gear 198 is rotatably supported on shaft K and is rigidly secured to gear 196. Gear 198 is in toothed engagement with gear 38.

The differential G adds the rotary oscillatory motion of the pinion P-5 to the rectified motion of gear 38 to yield an output to shaft K that is proportional to the radii R of crank arms 28 and 28'.

Control of the transmission as previously mentioned is achieved by electrically energizing the reversible electric motor L to rotate threaded rod 26 to move control arm M to concurrently vary the radii R of the two crank arms 28 and 28'. The transmission output shaft K serves both as a velocity and torque measuring instrument. The multiplication of these two valves in suitable units is the power output of the transmission.

For any power requirement of the engine driving the shaft A, there will be an optimum engine velocity. The criterion could be that velocity which results in minimum fuel consumption. The optimum transmission output to input velocity ratio is then the current output velocity divided by that input velocity which corresponds to the optimum engine velocity for the power currently being used.

A mini-computer 200 receiving the transmission output velocity and torque signals could instantly determine the current optimum desired transmission velocity ratio.

For any transmission velocity ratio there is a unique position for the control arm M, which position is achieved by rotation of the threaded rod 26 in an appropriate direction with the correct number of revolutions.

There are numerous devices and methods that are commercially available to electronically measure the velocity of the transmission output shaft K. One of the simplest methods is to count electronic pulses generated by electro-mechanical means as the output shaft K rotates.

Various feed back mechanisms are possible for use with the control motor L, all of which are commercially available. As the control motor L rotates it could generate one or more electric signal pulses per revolution. The electric pulses or signals thus generated would enter the mini-computer 200 which would add or subtract them from the running total according to the direction of rotation of the control motor L. The running total would indicate the position of the control arm M and hence the transmission velocity ratio. To compensate for any electronic errors or lost signals, separate switches could be used to indicate the two extreme positions of the control arm M. The computer 200 would control the direction of rotation of control motor L by controlling the polarity of its power current. As a desired position is approached, current could be decreased or even reversed to avoid over shooting.

Figure 4:
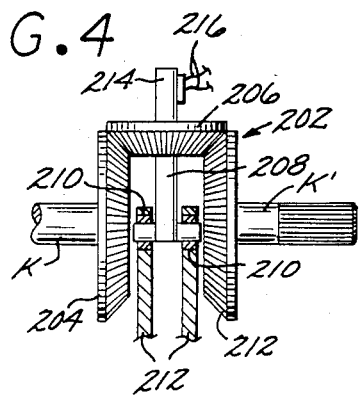
FIG. 4 is a top plan view of a torque sensing unit that may be included in the output shaft.

Torque of the shaft K may be measured by the assembly 202 shown in FIG. 4. The assembly 202 includes a bevel gear 204 secured to shaft K that is in toothed engagement with a second bevel gear 206 rotatably supported on a T-shaped member 208 that is supported by a pair of bearings 210. Second gear 206 is in toothed engagement with a third gear 212 that has a shaft extension K' secured thereto. Bearings 210 are supported in a fixed mounting 211. A strain gauge 214 is mounted on member 208. A pair of electrical conductors 216 extend from the strain gauge 214 to the mini-computer. Variations in the voltage flowing from the strain gauge 214 through conductors 216 are related to the torque imposed on shaft K.

The mini-computer 200 from the number of electrical impulses received from the velocity detector 201 and the voltage received from the torque indicator 202 will electrically energize the control motor L to move control arm M to a position to achieve optimum results from the transmission.

The structure of the transmission previously described is merely a preferred embodiment thereof and the specification is not to be interpretted as limited to the particular mechanical elements described therein and illustrated in the drawings. For instance the pinion P-3 in combination with a suitable bell crank assembly could be used to impart oscillatory motion to the rack C instead of the cam B. Pivotally supported linkage means may if desired be substituted for the control arm M to multiply the effective radii of the pins 30 and 30'. The rectifier F is subjected to numerous modifications, such as the shoes engaging the interior cylindrical surfaces of drums or the side surfaces of discs. Also, the rectifier could include a driven, mutilated spur pinion that in combination with a gear train could impart pulsating motion to the gear 38 in a single direction. Instead of variable radius cranks being used to multiply the motion as previously described, variable fulcrum levers could be used to attain the same result.

The use and operation of the transmission has been described previously in detail and need not be repeated.

What is claimed is:

1. A mechanical transmission that has an input and output shaft and a variable speed ratio, said transmission including:
   a. a differential that includes a spider secured to said output shaft, a pair of idler gears rotatably supported on said spider, and first and second gears rotatably supported on said output shaft and in toothed engagement with said idler gears;
   b. first and second mechanisms that include rotatable first and second crank arms, and first and second crank pins on said first and second arms that may move longitudinally thereon to have their radii varied, said first mechanism including a first shaft rotatably supported therein that has first and second ends, said first crank arm secured to said first end, said second mechanism including a second shaft rotatably supported therein that has first and second ends, said second crank arm secured to said first end of said second shaft;
c. first means for concurrently varying the radii of said crank pins;
d. second means that include first and second gears that are in toothed engagement and secured to said input shaft and said first shaft for transferring rotary motion from said input shaft to said first mechanism to rotate said first crank arm;
e. third means for transforming rotary motion of said first crank pin to rotary oscillating motion of said first gear of said differential;
f. fourth means for transforming rotary motion of said input shaft to oscillating rotary motion of said second crank arm said fourth means including:
 1. a cam rigidly secured to said input shaft, said cam including at least one lobe;
 2. a follower in contact with said cam;
 3. a toothed first rack that supports said follower, said first rack having linear oscillating motion imparted thereto as said cam rotates;
 4. a third gear secured to said second shaft, said third gear in engagement with said toothed first rack, and said third gear, second shaft, and secured crank arm having rotary oscillating motion imparted thereto as said first rack oscillates;
g. fifth means for transferring oscillating rotary motion of said second pin to pulsating rotary motion in a single direction;
h. sixth means for transferring said oscillating rotary motion of said fifth means to said second gear of said differential, for said differential to impart a fixed ratio of output to input velocities of said output and input shafts for each setting of said first means.

2. A mechanical transmission as defined in claim 1 in which said third means is a second toothed rack pivotally connected to said first crank pin of said first crank arm and in toothed engagement with said first gear of said differential.

3. A mechanical transmission as defined in claim 2 in which said fifth and sixth means includes:
 n. a third toothed rack pivotally connected to said second crank pin;
 o. a fourth gear in engagement with said third toothed rack, said fourth gear having rotary oscillating motion;
 p. a fifth gear in engagement with said second gear of said differential; and
 q. over riding clutch means operatively associated with said fourth and fifth gears for rectifying oscillating rotary motion of said fourth gear to pulsating rotary motion of said fifth gear.

4. A mechanical transmission as defined in claim 1 in which said first mechanism includes a first shaft rotatably supported therein, said first shaft having first and second ends, said first crank arm being a rigid tube secured to said first end of said first shaft and normal thereto, said first crank arm having a longitudinal slot therein through which first crank pin extends and an opening in said first crank arm adjacent said first shaft, said first mechanism including:
 i. a rod slidably mounted in said crank arm to which said first crank pin is secured, said rod having teeth defined thereon that may be moved into alignment with said opening;
 j. inner and outer concentric shells mounted on said first shaft, said inner shell having first and second longitudinal slots therein that are angularly disposed to one another;
 k. a first lug secured to said first shaft that slidably engages said first slot and a second lug secured to said outer shell that slidably engages said second slot, said outer shell occupying a fixed longitudinal position relative to said first shaft;
 l. a first gear secured to the end of said outer shell most adjacent said first crank arm;
 m. a second gear rotatably supported from said first crank arm and in engagement with said teeth on said rod; and
 n. gear means in engagement with said first and second gears, with said inner shell when moved longitudinally relative to said first shaft rotating said outer shell and first gear to rotate said second gear and gear means to move said rod longitudinally in said first crank arm to vary the radius of said first crank pin.

5. A mechanical transmission as defined in claim 4 in which said second mechanism includes a second shaft rotatably supported therein, said second shaft having first and second ends, said second arm being a rigid tube secured to said first end of said second shaft and normal thereto, said second arm having a longitudinal slot therein through which said second crank pin extends and an opening in said second crank arm adjacent said second shaft, said second mechanism including:
 o. a rod slidably mounted in said crank arm to which said first crank pin is secured, said rod having teeth defined thereon that may be moved into alignment with said opening;
 p. inner and outer concentric shells mounted on said first shaft, said inner shell having first and second longitudinal slots therein that are angularly disposed to one another;
 q. a first lug secured to said first shaft that slidably engages said first slot and a second lug secured to said outer shell that slidably engages said second slot, said outer shell occupying a fixed longitudinal position relative to said first shaft;
 r. a first gear secured to the end of said outer shell most adjacent said first crank arm;
 s. a second gear rotatably supported from said first crank arm and in engagement with said teeth on said rod; and
 t. gear means in engagement with said first and second gears, with said inner shell when moved longitudinally relative to said second shaft rotating said outer shell and first gear to rotate said second gear and gear means to move said rod longitudinally in said second crank arm to vary the radius of said second crank pin.

6. A mechanical transmission as defined in claim 5 in which said first means is a rigid control arm that extends between said inner shells of said first and second mechanisms for concurrently moving said inner shells longitudinally relative to said first and second shafts to concurrently vary the radii of said first and second crank pins.

7. A mechanical transmission as defined in claim 6 in which said first means in addition includes:
 u. a reversible electric motor;
 v. a threaded rod driven by said electric motor that engages a tapped bore in said control arm, said electric motor when electrically energized rotating said threaded rod to move said control rod to concurrently move said inner shells relative to said first and second shafts to vary the radii of said first and second crank pins.

8. A mechanical transmission as defined in claim 7 which in addition includes:
   w. torque sensing means operatively associated with said output shaft that emits an electric signal that varies in relation to the torque imposed on said output shaft;
   x. velocity sensing means operatively associated with said output shaft that emit an electric signal that varies in relation to the velocity of said output shaft; and
   y. electrically operated means responsive to said signals from said torque and velocity sensing means to control the flow of electric power to said motor to cause said motor to rotate and so position said control arm that the ratio of transmission output to input velocity is at an optimum value for the exiting power requirement.

* * * * *